United States Patent
Tolman

[15] 3,693,632
[45] Sept. 26, 1972

[54] TOBACCO-SMOKE FILTERS

[72] Inventor: Thomas William Charles Tolman, Eastleigh, England

[73] Assignee: Brown and Williamson Tobacco Corporation, Louisville, Ky.

[22] Filed: April 7, 1971

[21] Appl. No.: 132,212

[30] Foreign Application Priority Data

April 20, 1970 Great Britain..........18,757/70

[52] U.S. Cl..............131/266, 131/262 A, 252/411 S
[51] Int. Cl. ..............................................A24b 15/02
[58] Field of Search...252/411, 429 R; 131/261, 262, 131/264–267

[56] References Cited

UNITED STATES PATENTS

| | | | |
|---|---|---|---|
| 3,251,365 | 5/1966 | Keith et al. | 131/265 X |
| 3,368,566 | 2/1968 | Avedikian | 131/10.7 |
| 3,434,479 | 3/1969 | Till et al. | 131/10.9 |

*Primary Examiner*—Melvin D. Rein
*Attorney*—Kane, Dalsimer, Kane, Sullivan and Kurucz

[57] ABSTRACT

A tobacco-smoke filter includes a granular compound or substance comprising silver permanganate and zinc oxide and acting as a catalyst for the oxidation in combination with chloramine-T for preventing poisoning of the catalyst by tobacco-smoke. For instance, the catalyst compound or substance may be interposed between a mouth-end filter section of cellulose-acetate and a filter section of paper soaked in a solution of the chloramine-T.

3 Claims, No Drawings

TOBACCO-SMOKE FILTERS

This invention concerns improvements relating to tobacco-smoke filters for cigarettes and other smoking articles.

It is well known that the smoke from burning tobacco contains a wide variety of different chemical substances which may be wholly in either the particulate or the vapor phase of the smoke, or partially in both phases. Many of these substances contribute nothing pleasant to the taste or aroma of the smoke. There are some in the vapor phase which it may be preferred to eliminate or reduce substantially, such for example as carbon monoxide.

Among filters which have been proposed are various filters comprising a solid absorbent, such as activated charcoal, alumina or the like, contained between two plugs of other material, generally conventional filtering material. Impregnation of the absorbent with various materials in order to improve the adsorption of specific constituents of tobacco smoke has also been proposed. Filters containing such adsorbents have usually been of limited effectiveness.

It is an object of the present invention to provide a tobacco-smoke filter which is capable of removing substantial quantities of carbon monoxide without adversely affecting the taste of the smoke.

According to the invention, a filter for tobacco-smoke includes a granular compound or substance comprising silver permanganate and zinc oxide and acting as a catalyst for the oxidation of carbon monoxide to carbon dioxide, in combination with chloramine-T for preventing poisoning of the catalyst.

As is known, the activity of a catalyst may be suppressed by the presence of certain other substances, so that it appears to be "poisoned." With cigarette smoke, catalyst poisoning may occur due to the presence of sulphur-bearing compounds. Such poisoning is effectively prevented by the chloramine-T.

Advantageously, the catalyst is prepared in the following manner:

Silver nitrate (8 g) is dissolved in distilled water (12 ml). This solution is then added slowly, with stirring, to finely powdered zinc oxide (7 g) and the mixture is worked to a smooth paste. Potassium permanganate (8.3 g) dissolved in distilled water (120 ml) is added to the zinc oxide/silver nitrate paste while stirring vigorously, stirring being continued for about one hour. The resultant slurry is cooled to a temperature of about $-17°$ C and maintained at that temperature for about 2 hours. The cold slurry is filtered through a sintered glass funnel and washed with five portions (each 5 ml) of cold distilled water. The filtrate is removed from the funnel and left to dry, as a cake, under ambient conditions. The semi-dry residue is pressed into pellets using a pressure of approximately 10 tons per sq. inch. The pellets are crushed and sieved to a mesh-size range of 0.30–0.71 mm (22–52 British Standard). The granular silver permanganate/zinc oxide catalyst thus produced contains 34 mole percent of silver permanganate.

A filter incorporating the catalyst, thus prepared, in combination with chloramine-T may be prepared in the following manner:

1.5 g of the granular $AgMnO_4/ZnO$ is interposed between a filter section, 5 mm long, consisting of cellulose acetate at the mouth-end and a filter section, 10 mm long, consisting of paper which has been soaked in a 10 percent aqueous solution of chloramine-T, giving a composite filter of 35 mm total length.

Such filters were attached to cigarettes and smoked, using a smoking engine which provided one puff per minute of 2 seconds duration and 35 ml volume. On analysis of the smoke from the cigarettes, it was found that 50–60 percent carbon monoxide had been removed.

The use of an aqueous solution of chloramine-T was preferred, as the presence of water was found to enhance the activity of the chloramine-T and hence the efficiency of the catalyst.

Further specific examples of the use of the granular $AgMnO_4/ZnO$ will now be described:

EXAMPLE 1

Triple filters, 30 mm long, were prepared in which the center section, 10 mm long, was composed of 1,000 mg of the granular $AgMnO_4/ZnO$. The filter section, 5 mm long, at the mouth-end consisted of cellulose acetate and the other section, 15 mm long, was made of paper which had been impregnated with a 10 percent aqueous solution of chloramine-T. The filters were attached to cigarettes and smoked using a smoking engine which provided one puff per minute of 2 seconds duration and 35 ml volume. On analysis of the smoke from the cigarettes, it was found that 41 percent carbon monoxide had been removed.

EXAMPLE 2

On smoking cigarettes through a similar filter, 40 mm long, of which the center section, 20 mm long, was composed of 2,000 mg of the granular $AgMnO_4/ZnO$, the reduction in carbon monoxide was 68 percent.

For comparison purposes, cigarettes were smoked through a triple filter, 35 mm long, in which 1,500 mg of the granular $AgMnO_4/ZnO$ was interposed between a mouth-end section, 5 mm long, consisting of cellulose acetate and a section, 15 mm long, consisting of paper which had not been treated with chloramine-T. The reduction in carbon monoxide was less than 10 percent.

Also for comparison purposes, cigarettes were smoked through a dual filter of which one section consisted of cellulose acetate and the second of paper which had been impregnated with a 10 percent solution of chloramine-T. The reduction in carbon monoxide was zero.

It will be seen from the examples that $AgMnO_4/ZnO$ is an effective catalyst for the oxidation of carbon monoxide to carbon dioxide and that the poisoning effect of tobacco smoke in reducing catalytic activity is largely prevented by the use of chloramine-T.

I claim:

1. A tobacco-smoke filter conforming to the cross section of a tobacco smoking article including a granular substance comprising silver permanganate and zinc oxide and acting as a catalyst for the oxidation of carbon monoxide to carbon dioxide, in combination with chloramine-T for preventing poisoning of the catalyst.

2. A sectional filter as claimed in claim 1, wherein the chloramine-T is provided in a filter section other than that comprising the catalyst substance.

3. A sectional filter as claimed in claim 1, wherein the catalyst substance is interposed between a mouth-end filter section of cellulose-acetate and a filter section of paper soaked in a solution of the chloramine-T.

* * * * *